US008225094B2

(12) United States Patent  
Willey

(10) Patent No.: US 8,225,094 B2
(45) Date of Patent: Jul. 17, 2012

(54) DEVICE AUTHENTICATION IN A PKI

(75) Inventor: William D. Willey, San Francisco, CA (US)

(73) Assignee: Certicom Corp., Mississauga (CA)

( * ) Notice: Subject to any disclaimer, the term of this patent is extended or adjusted under 35 U.S.C. 154(b) by 144 days.

(21) Appl. No.: 12/379,847

(22) Filed: Mar. 3, 2009

(65) Prior Publication Data

US 2009/0292920 A1    Nov. 26, 2009

Related U.S. Application Data

(63) Continuation of application No. 10/117,186, filed on Apr. 8, 2002, now Pat. No. 7,516,325.

(60) Provisional application No. 60/281,556, filed on Apr. 6, 2001.

(51) Int. Cl.
H04L 29/06 (2006.01)
(52) U.S. Cl. ........................................................ 713/168
(58) Field of Classification Search .......................... None
See application file for complete search history.

(56) References Cited

U.S. PATENT DOCUMENTS

| | | | |
|---|---|---|---|
| 4,926,480 A | 5/1990 | Chaum | |
| 5,241,599 A | 8/1993 | Bellovin et al. | |
| 5,450,493 A | 9/1995 | Maher | |
| 5,493,283 A | 2/1996 | Hopper et al. | |
| 5,659,617 A | 8/1997 | Fischer | |
| 5,793,866 A | 8/1998 | Brown et al. | |
| 5,933,504 A | 8/1999 | Vanstone et al. | |
| 5,953,424 A | 9/1999 | Vogelesang et al. | |
| 6,047,066 A | 4/2000 | Brown et al. | |
| 6,148,205 A | 11/2000 | Cotton | |
| 6,240,513 B1 | 5/2001 | Friedman et al. | |
| 6,304,658 B1 | 10/2001 | Kocher et al. | |
| 6,704,608 B1 * | 3/2004 | Azuma ........................... 700/66 |
| 6,772,331 B1 | 8/2004 | Hind et al. | |
| 7,058,414 B1 | 6/2006 | Rofheart et al. | |
| 2002/0123325 A1 * | 9/2002 | Cooper ........................ 455/411 |

OTHER PUBLICATIONS

Menezes et al. Handbook of Applied Cryptography 1997 CRC Press pp. 397-405.*
Brands, S. And Chaum, D.; "Distance-Bounding Protocols"; Proceedings of Cryptography, Eurocrypt '93; 1993; pp. 344 to 359; LNCS; vol. 765; Springer-Verlag; New York, U.S.A.
Holmes, D.; "Optimizing the User Experience"; Bluetooth™ Developers Conference; Dec. 5, 2000; San Jose, U.S.A.
Ranta, C.; "Human Interface Device Protocol Over Bluetooth"; Bluetooth™ Developers Conference; Dec. 4, 2000; San Jose, U.S.A.
Redding, B.; "Implementing Wireless Headset Functions in Mobile Phone Handsets"; Bluetooth™ Developers Conference; Dec. 6, 2000: San Jose, U.S.A.
Stajano, F. and Anderson, R.; "The Resurrecting Duckling: Security Issues for Ad-hoc Wireless Networks"; Proceedings of the 7th International Workshop on Security Protocols; Apr. 1999; pp. 172 to 194; LNCS; vol. 1796; Springer-Verlag; London, U.K.
Struik, R.; "Providing Security for Ad-hoc Wireless Networking;" The Cryptographer's Track at the RSA 2002 Conference; Jun. 2001.

* cited by examiner

Primary Examiner — David Pearson
(74) Attorney, Agent, or Firm — Novak Druce + Quigg LLP

(57) ABSTRACT

A method for establishing a link key between correspondents in a public key cryptographic scheme, one of the correspondents being an authenticating device and the other being an authenticated device. The method also provides a means for mutual authentication of the devices. The authenticating device may be a personalized device, such as a mobile phone, and the authenticated device may be a headset. The method for establishing the link key includes the step of introducing the first correspondent and the second correspondent within a predetermined distance, establishing a key agreement and implementing challenge-response routine for authentication. Advantageously, main-in-the middle attacks are minimized.

21 Claims, 9 Drawing Sheets

DEVICE AUTHENTICATION IN A PKI

CROSS REFERENCE TO RELATED APPLICATIONS

This application is a continuation of U.S. patent application Ser. No. 10/117,186 filed on Apr. 8, 2002 now U.S. Pat. No. 7,516,325 which claims priority from U.S. Provisional Application No. 60/281,556 filed on Apr. 6, 2001 all of which are incorporated by reference.

FIELD OF THE INVENTION

This invention relates to the field of cryptology and in particular to a method for authenticating wireless devices in a PKI scheme.

BACKGROUND OF THE INVENTION

In the past wireless devices were limited in applications, were not always interoperable and were only available from a few vendors. However, today emerging wireless standards and products are fuelling growth in the wireless communications market. This growth has also been aided by a number of factors, such as, the availability of a range of unlicensed frequencies in the 2.40 ti 2.48 GHz band and 5 GHz band, a larger mobile work force and the globalization of electronic commerce. One of the well-known standards is the BLUETOOTH® specification, developed by a CONSORTIUM OF COMPANIES, THE Bluetooth Special Interest Group (SIG) and a trademark of Ericsson, Sweden. The BLUETOOTH specifications defines a universal radio interface in the 2.45 GHz frequency band that enables wireless electronic devices to connect and communicate wirelessly via short-range, ad hoc networks. The typical communication range of a BLUETOOTH wireless device is 30 to 100 feet.

Generally, wireless devices built according to the BLUETOOTH specification include a link level security feature that enables these devices to authenticate each other and encrypt their communications using a symmetric link key shared between the two devices. Typically, a pairing procedure is defined, which enables a user to establish a link key shared between two devices, where the two devices may be previously unknown to one another.

One security problem in the pairing procedure of the current BLUETOOTH specification results from the fact that radio signals can be easily intercepted. It has therefore been suggested that a user performing the pairing procedure should be in a private area such as his home or where it is less likely that the communication between the devices being paired could be eavesdropped. Therefore pairing in a public place where an attacker could easily eavesdrop on the communication between the devices being paired is discouraged.

At present, the pairing procedure requires the manual entry of a code or a personal identification number (PIN) into one or both of the devices. However, if the small-sized pin PIN is chosen to facilitate manual entry, then it is possible for an eavesdropper to determine the link key. Therefore, the number of digits or characters in the PIN must be unreasonably large in order to ensure that an eavesdropper cannot determine the link key. Typically, entry of even a short PIN is tedious for the user of the devices and prone to error; while using a PIN long enough to be secure is even worse. Furthermore, some devices are not expected to have a user interface that is conducive to the entry of a PIN. For example, a BLUETOOTH headset may be paired to a mobile telephone, such that the headset may include an input device such as a button and the telephone would include an input device and an output device such as a display. It is currently contemplated that a new headset would included a pre-programmed PIN, and in order to pair the headset with the phone, the user is required to enter the PIN using the keypad of the phone.

One of the solutions presented for facilitating pairing are techniques such as Diffie-Hellman protocol that can be used to establish a shared key. However, techniques such as Diffie-Hellman are vulnerable to a man-in-the-middle attack. Prior art methods have been established that use a key agreement technique such as Diffie-Hellman followed by a verification step to establish a shared key, the purpose of the verification step being to detect a man-in-the-middle attack. For example, U.S. Pat. No. 5,450,493 describes a scheme in which two devices communicate over an insecure telephone line and perform a Diffie-Hellman key agreement to establish a shared secret. Although it is known that it is possible for an attacker to force both devices to establish the same shared secret via a small subgroup attack, it is possible to defeat the small subgroup attack, as described in U.S. Pat. No. 5,933,504 to Vanstone, et al.

The following methods have been proposed to prevent these attacks, these include checking that the Diffie-Hellman shared secret does not lie in a small subgroup and rejecting the secret if it does, or using a secondary shared secret derived as the bash of the Diffie-Hellman shared secret and the exchanged public keys. Following the key agreement, an antispoof variable based upon the shared key is computed independently by each of the communicating devices. The antispoof variable is then displayed to both devices and over the insecure telephone line the two devices then verbally determine if the antispoof variable is the same. One could read the antispoof variable to the other, for example. The assumption made is that a perpetrator of a man-in-the-middle attack would be detected because of the difficulty in forging the voice of the communicating devices.

This technique may be applied to the BLUETOOTH headset pairing scenario. However, for this scenario, there is only one user involved. After initiating the pairing the headset and phone would perform a key agreement such as Diffie-Hellman. The devices could compute the antispoof variable based upon the shared key. The phone could then display the antispoof variable on its display. The headset has no display, but it could take the place of the other user and use text-to-speech capability to automatically transmit the digits of the variable to the phone over the BLUETOOTH link as audio. The phone would play the audio. The user could then listen to the value on the phone and compare it to the value on the display. A man-in-the-middle attack is a problem for this method since it would be easy for an attacker to forge the audio output of a text-to-speech capability and transmit forged speech to the phone.

Other public key methods can be used to establish a shared key in such a way as to be resistant to a man-in-the middle attack. Public key methods may be impractical for use in the BLUETOOTH headset pairing scenario (and in other BLUETOOTH pairing scenarios). To use public key methods the headset and phone, would both have public keys and private keys. A certificate signed by a Certificate Authority would be required for each device in order to avoid a man-in-the-middle attack. A certificate typically only has a limited validity period, so a device must have an accurate time source in order to validate a certificate. An out-of-the-box BLUETOOTH headset would be unlikely to have an accurate time source, so it may be unable to validate a certificate. Furthermore, to validate a certificate, an online check with a server on the Internet may be required to check a certificate revocation list or an online certificate status protocol client. This online check guards against the compromise of a device's private key. Without this check, the devices may be vulnerable to a man-in-the-middle attack perpetrated by an attacker having a compromised private key. In some circumstances it may be possible for a phone to make the online check if it has Internet connectivity. However, it would be desirable to pair a phone with a headset before a phone has established service with a service provider. For example, a user may wish to establish a link key between a new phone and a new headset, then use the headset and phone to sign up for service an over-the-air service provisioning procedure. Sensitive information would be sent from the headset to phone and then to the service provider; this information requires protection even before the phone has been provisioned over the air.

The desirability of authenticating the location of a correspondent in a wireless environment is recognized in U.S. Pat. No. 5,659,617. It is proposed that the exact location of a correspondent can be obtained using GPS to ensure that certain acts are performed in designated locations, for example, the signing of a certificate within a bank. It is also proposed to determine the position of a correspondent by measuring its distance from a fixed beacon. However, such an arrangement within the context of a BLUETOOTH device would require the provision of a fixed beacon and information about acceptable location in which the particular devices could be paired.

Moreover, this technique requires that a security relationship already exist between the two devices via the use of certificates and PKI; obviously this is an unacceptable constraint since the object is to establish a security relationship when none exists. Furthermore, according to the embodiments shown, distance from a fixed beacon is measured by having the measuring device transmit a signal to the measured device using RF, for example. The measured device then receives the transmitted signal, which may include some sort of challenge. The measured device then performs some sort of cryptographic operation to the measuring device. The measuring device then measures the time of the receipt of the response. The measuring device then computes a round trip time by subtracting the time at which its signal was transmitted from the time of the receipt of the response.

The round trip time includes two components. The first component is the processing time required by the measured device to recover the signal from the measuring device, determine the response (potentially including cryptographic operations), and begin transmitting the response. This first component is a fixed predetermined value that gives a measured device adequate time to perform any appropriate processing. Examples of the processing are cryptographic operations and also conventional techniques used in digital radios such as despreading, deinterleaving, and decoding of the received signal and encoding interleaving and spreading of the transmitted signal.

The second component is the time it actually takes the RF signal to travel from the measuring device to the measured device and then from the measured device to the measuring device. Since RF signals travel at the speed of light, the measuring device computes the distance by taking the difference between the round trip time and the fixed first component allocated for processing and multiplying this difference by the speed of light divided by two.

It should be noted that the distance light could travel during the processing time allocated for the first component of the round trip time is large compared to the distances being measured. For example, suppose that the processing time allocated is one microsecond. The speed of light is approximately one foot per nanosecond which means, that in the allocated microsecond, light could travel about 1000 feet which would correspond to a measured distance between two devices of 500 feet. It should be further noted that in a conventional microprocessor one microsecond would not be long enough to perform cryptographic operations used by the prior art techniques. A legitimate device being measured observes the fixed processing time and transmits the return signal precisely after the amount of processing time allocated. A device used by an attacker to perpetrate a man-in-the-middle attack need not abide by the fixed processing time. An attacking device may return a response sooner than if it abided by the fixed processing time. For example, suppose an attacking device is 20 feet away from the measuring device and wishes to appear to be only one foot away. As long as the attacker can prepare the response 38 nanoseconds sooner than the fixed processing time, it can do so. The attacking device can remove 38 nanoseconds from the fixed processing time (returning the response 38 nanoseconds sooner than a legitimate device would) and therefore appear to be within one foot of the measuring device.

For devices that are capable of infrared communication using a standard such as the IrDA standards it has been suggested in the prior art that establishment of a link key between two devices may be accomplished by having one device transmit the BLUETOOTH PIN in plaintext to the other device using an infrared transmission. This would make it possible for an eavesdropper capable of receiving infrared transmissions to determine the link key and eavesdrop on the communication between the two devices.

Accordingly, it is an object of the present invention to obviate or mitigate one or more of the above disadvantages.

SUMMARY OF THE INVENTION

In accordance with one of its aspects, the invention provides a method for establishing a link key between correspondents in a public key cryptographic scheme, one of the correspondents being an authenticating device and the other being an authenticated device The method also provides a means for mutual authentication of the devices. The method for establishing the link key includes the steps of introducing the first correspondent and the second correspondent within a predetermined distance and establishing a key agreement and implementing challenge-response routine for authentication. Advantageously, eavesdropping or man-in-the middle attacks are minimized.

In another aspect of the invention, the invention provides a method for establishing a key between a first device and a second device, and includes the step of establishing a shared secret in the first device and in the second device. The method also includes the substeps of: calculating an antispoof variable based at least in part upon the shared secret in the first device and in the second device, the antispoof variable being represented by a plurality of digits; indicating the digits of the antispoof variable from the first device to a user using a first stimulus; indicating the digits of the antispoof variable from the second device to the user using a second stimulus; verifying that the digits of the antispoof variable from the first device and the second device are the same; and establishing the key based upon the result of the verifying step.

BRIEF DESCRIPTION OF THE DRAWINGS

These and other features of the preferred embodiments of the invention will become more apparent in the following detailed description in which reference is made to the appended drawings wherein.

DESCRIPTION OF PREFERRED EMBODIMENTS

Figure 1:
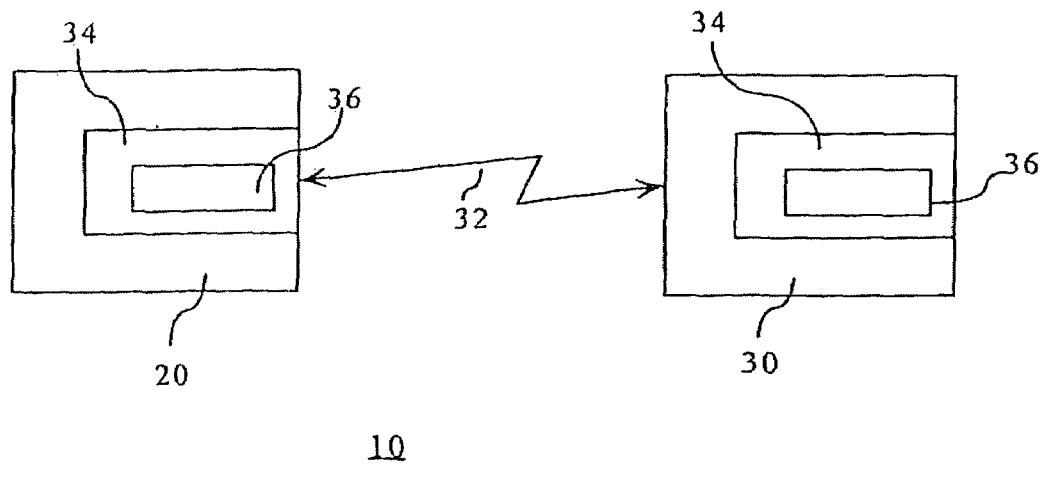
FIG. 1 is a schematic representation of a communication system.
Figure 2:
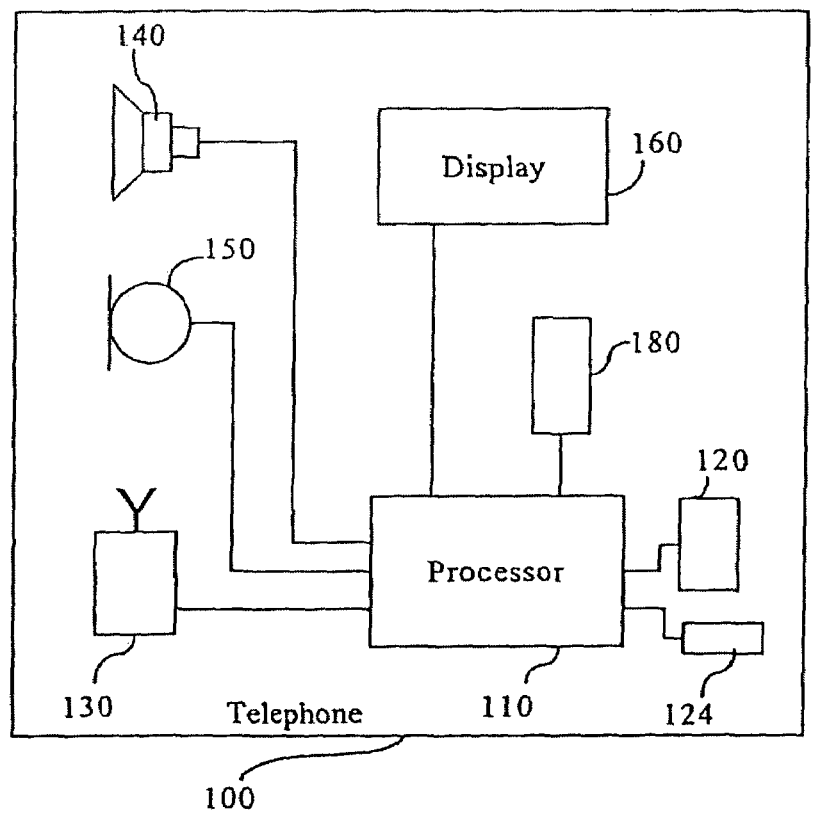
FIG. 2 is a block diagram representation of a mobile telephone.

FIG. 1 shows a communication system 10 having a first correspondent 20 in a communication with a second correspondent 30 over a radio frequency (RF) link 32. A cryptographic engine 34 using a symmetric key 36 established during a public key exchange encrypts such communication. The first correspondent 20 is designated an authenticating device and the second correspondent 30 is designated an authenticated device. In the preferred embodiment, the authenticating device 20 may be a mobile telephone 100 or a personal digital assistant 200 as shown in FIGS. 2 and 3 respectively, and the second authenticated device 30, a headset 300.

Generally, the mobile telephone 100 includes a processor 110 for executing an instruction set for the operation of the mobile telephone handset 100, including instruction to perform the link key establishment. The processor 110 preferably includes a microprocessor and a digital signal processor for manipulating different types of information, such as, sound, images, and video. The processor 110 is coupled to a BLUETOOTH module 120, such as the ROK 101 007 available from Ericsson Microelectronics, Sweden, for implementing BLUETOOTH functionality in the mobile telephone 100. Also coupled to the processor 110 is an antenna 130 for transmitting and receiving signals over the wireless RF communication link 32, a speaker 140 and a microphone 150. The telephone 100 also includes other components such as an analog to digital (A/D) converter for processing analog sound signals from the microphone 150 into digital signals for the processor 110, and a digital to analog (D/A) converter to convert digital sound signals for output via the speaker 140. A timer 124 for timing functions, a display 160 an input device 180 such as a keypad, are also coupled to the processor 110 is coupled to. However, the input device 180 may be a keyboard, a touch screen input, or any other suitable input device. The mobile telephone 100 also has a modem coupled to the antenna 130 and associated hardware and software (not shown) for operating on a communication network such as a TIA/EIA-95-D system or GSM.

Figure 3:
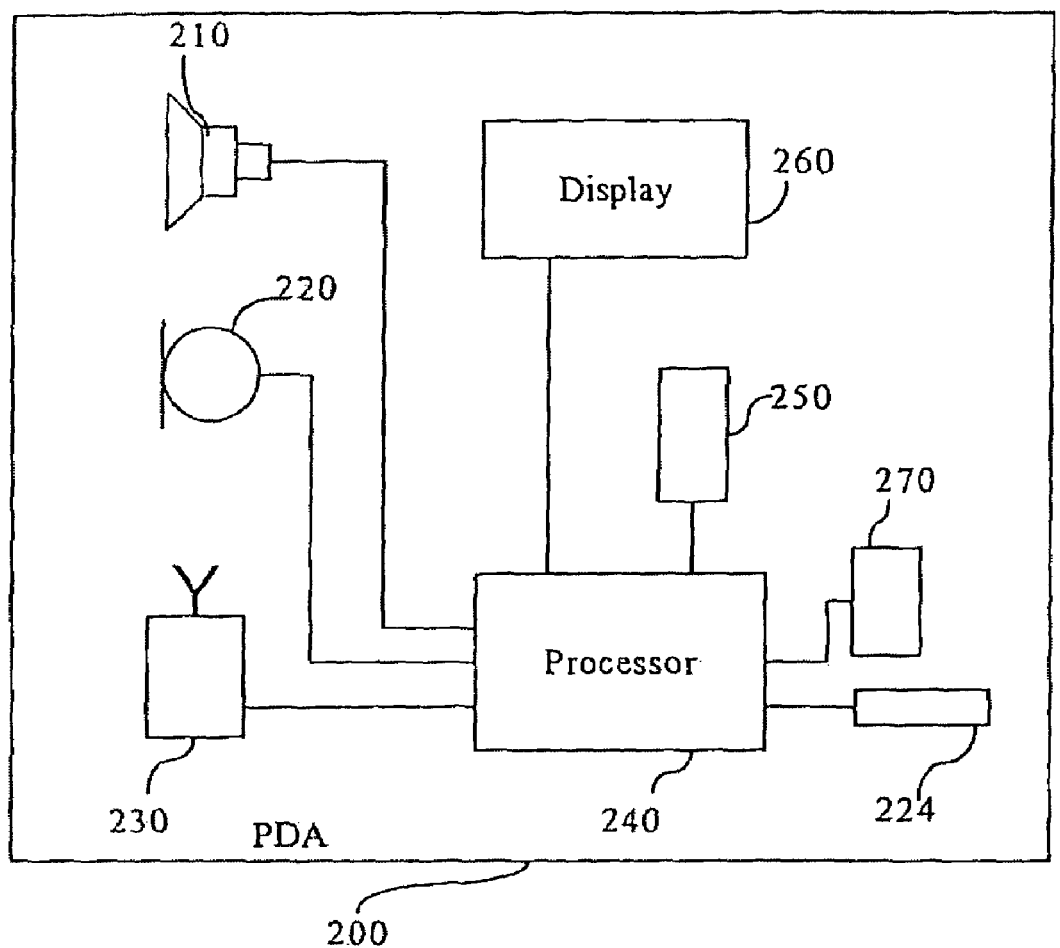
FIG. 3 is a block diagram of a personal digital assistant (PDA)

Turning now to FIG. 3, which shows a block diagram of a personal digital assistant (PDA) 200, which is similar to the mobile telephone 100 and includes similar components having similar functionalities. However, in this instance, the PDA may not have a cellular modem. Thus, the PDA 200 includes a speaker 210, a microphone 220, a timer 224, a display 260, a processor 240 and an input device 250. In addition, coupled to processor 240 is an infrared transmitter and receiver module 270, which is capable of transmitting and receiving information using infrared light using standards such as the IrDA standards from the infrared Data Association, Walnut Creek, Calif. The PDA 200 may be a PALM® device available from Palm Corporation, California, U.S.A.

Figure 4:
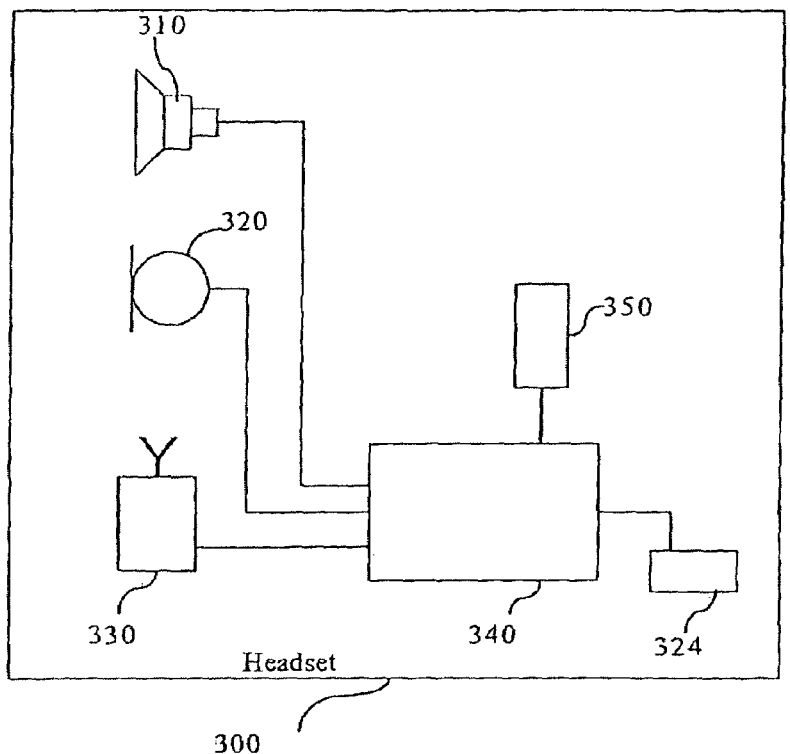
FIG. 4 is a block diagram of a headset.

Now referring to FIG. 4 showing a block diagram of a BLUETOOTH headset 300, once again the headset 300 is very similar to mobile telephone 100 with similar components having similar functionalities. The headset 300 does not have a cellular modem, however. The headset 300 includes a speaker 310, a microphone 320, an timer 324, an antenna 330, a processor 340 and an input device 350 such as a button.

Figure 5:
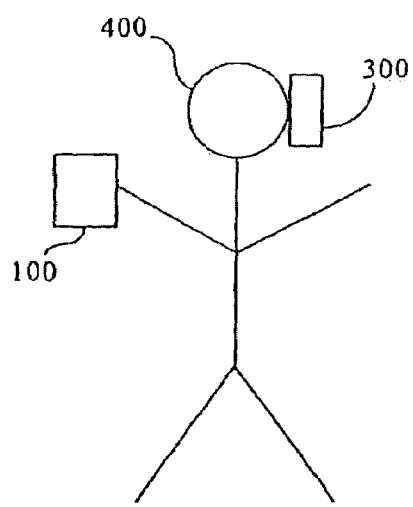
FIG. 5 is a user performing a pairing procedure between the headset and the telephone.
Figure 5A:
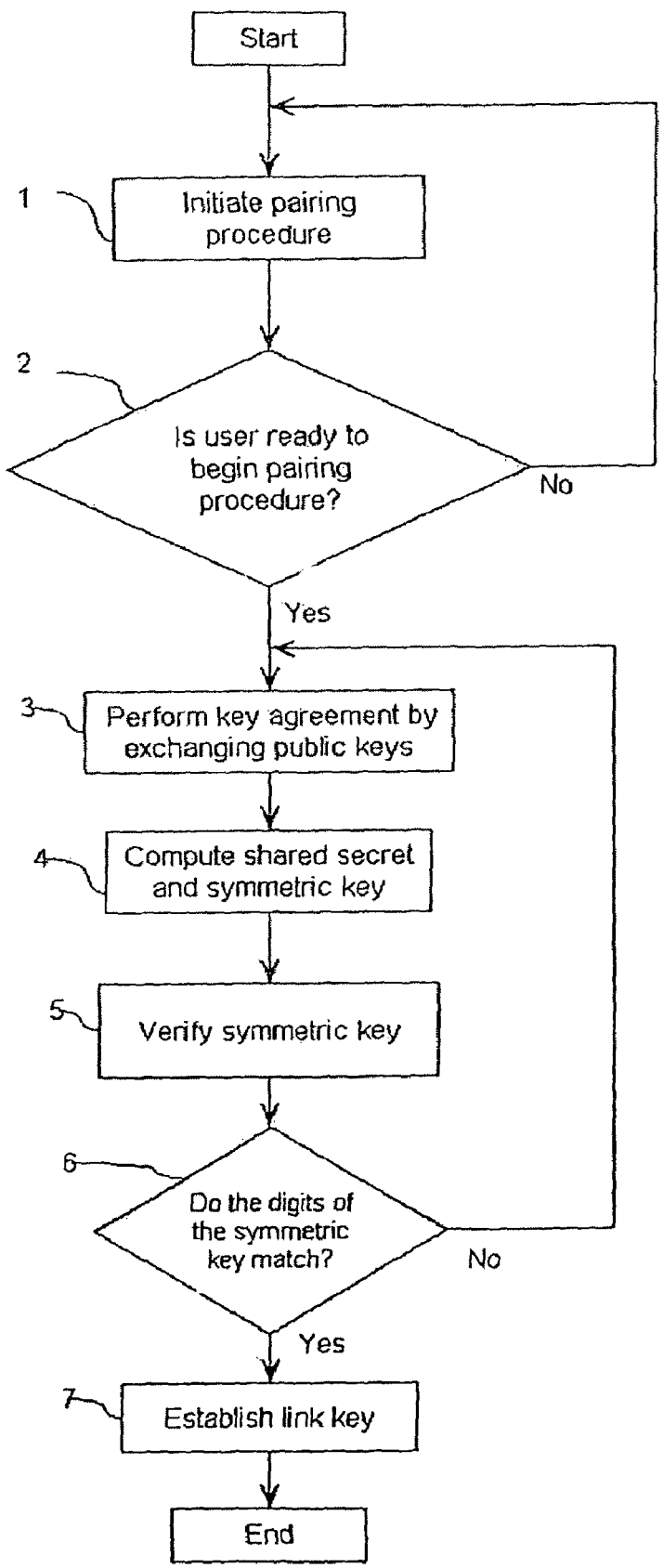
FIG. 5A is a flowchart outlining the steps for pairing devices.

As described above, a pairing procedure enables a user 400 to establish a link key shared between two devices 100 and 300, which are previously unknown to one another. A method for performing a pairing procedure two devices, such as a headset 300 and the telephone 100, is described with reference to FIG. 5 in conjunction with a flow chart of FIG. 5a. Preferably the headset 300 is ergonomically designed to be worn on the head of the user 400 such that the speaker 310 is adjacent to the ear of the user 400 and the microphone 320 is near the mouth of the user 400.

In step 1 of the method, the user 400 initiates the pairing procedure via the user interface 160. This may be accomplished by selecting a pairing menu item from the display 160 using the input device 180. Step 1 also includes the substeps in which the user 400 initiates a wireless communication link 32 between the telephone 100 and the headset 300. If the telephone 100 supports multiple languages, it also sends a message to the headset 300 indicating the language of the telephone 100, either within the same message or separately. Typically, since the headset 300 is new and unknown to the telephone 100, it accepts the request and begins the pairing procedure. Alternatively, the headset 300 may require the user 400 to confirm the pairing by pressing input device 350 before initiating the pairing procedure. To facilitate this, the headset 300 plays an audible message to the user 400 in the preferred language requesting the user 400 to initiate the pairing procedure.

When the headset 300 accepts the initiation of the pairing based on the actuation of button 350, it sends a confirmation message to the handset 100. In step 2, the handset 100 determines whether the user 400 is ready to begin the pairing procedure, when the user 400 responds positively, the two devices 100 and 300 perform a key agreement.

Preferably the key agreement is an elliptic curve Diffie-Hellman key agreement, preferred for the fast execution speed of the cryptographic operations using elliptic curve cryptography. During key agreement, in step 3, each device 100 or 300 exchanges public keys by sending a message that includes its public key to the other device 100 or 300. The next step 4 includes the computation of the shared secret by both devices 100 and 300, so that as a result of the key agreement procedure, both devices 100 and 300 have a shared secret value that is used to derive a symmetric key 36.

The symmetric key 36 or antispoof variable or is computed in device 100, 300 to ensure that both devices 100, 300 have the same secret key. The antispoof variable 36 is based upon a one way function of the shared secret. However, the antispoof variable 36 may be the shared secret concatenated with a fixed binary string and input into a SHA-1 hash algorithm. The output of SHA-1 hash algorithm is then converted to decimal and a predetermined number of least significant digits would be used as the antispoof variable 36. For example, the calculated antispoof variable 36 is 621413, which is stored temporarily in the processor 110.

In step 5, the handset 100 informs the user 400 via the display 160 that in order to complete the pairing procedure the user 400 should verify that each digit that is about to be displayed by the display 160 is the same as the digit that is announced simultaneously via the speaker 140. The devices 100 and 300 then begin the process of indicating the digits of the antispoof variable 36 to the user 400 one after the other. The simultaneous display and announcement of the digits on either device 100, 300 substantially diminishes the threat of man-in-the-middle attack. Therefore, time synchronization of the numbers on the two devices 100 and 300 is important.

Time synchronization can be achieved for both devices 100 and 300 by basing the liming of this process on the time of the message with the last public key is exchanged. The first public key is sent from the headset 300 to the handset 100 at time $t_1$, the second public key is sent from the handset 100 to the headset 300 at time $t_2$. The handset 100 starts a timer 124 at the time it sends its public key to the headset 300. If the message must be retransmitted because of RF factors, the timer is restarted at the time of a retransmission. The value of this timer 124 is chosen such that it is at least long enough to allow the elliptic curve Diffie-Hellman computation and the computation of the antispoof variable 36 (on both devices 100 and 300) to complete before its expiration.

The headset 300 in turn starts a timer 324 at the time it receives the public key from the handset 100. Again, in case of reception of a retransmission, the timer 324 is restarted at the time of reception of a retransmission. The time for this timer 324 is set to the same value as the handset timer 124. When the timer 124 in the handset 100 expires, the first digit of the antispoof variable 36 is read out by processor 110 so that the handset 100 displays a numeral "6" on its display 160, corresponding to the first most significant bit of the antispoof variable 36. The timer 124 is reset to start a new time interval.

When the timer 324 expires the headset 300 plays an audio representation of "six" in the preferred language and starts a next audio digit timer interval for timer 324. The value of the next audio digit timer 324 interval is long enough to allow sequential audio announcement of the antispoof variable 36 digits. For example, the timer 324 may be 500 ms plus the time required to play the digit. The handset 100 displays the first digit "6" during the next display digit timer 124 interval and at the end of that interval it stops displaying the digit. The next display digit timer 124 is reset and the, handset 100 displays the next digit in the antispoof variable 36, namely a numeral "2" on display 160. Likewise, when the next audio digit timer 324 expires, the headset 300 plays an audio representation of "two". The handset 100 the headset 300 continue with the subsequent digits in sequence: one, four, one, and three. The timers 124 and 324 may be likewise used with the subsequent digits in such a way that a digit is displayed on the handset 300 at substantially the same time as the headset 300 is playing it.

Although it has been described that a digit is displayed beginning at exactly the same time as the headset 300 starts to play it, it should be noted that experiments with user reactions to different timing show that slightly different timing is preferred by users. For example, the display could begin slightly earlier or slightly later. Generally, a digit is displayed at substantially the same time as it is played and these occurrences need not happen simultaneously. However, the time in between such occurrences is such that it is sufficient to substantially minimize the threat of a man-in-the-middle attack.

The one-after-the-other timing and synchronization of the digits on the two devices 100 and 300 facilitates comparing the digits for the user 400. In step 6, after the last digit has been displayed and played, the user 400 is prompted to acknowledge that the digits matched. For example, the handset 100 displays a message to determine whether the digits displayed by the handset 100 were played by the headset 300 at the same time. The user 400 can responds by pressing the button 350, or otherwise.

If the user 400 does not give positive confirmation on both devices 100 and 300 or if the user 400 indicates a mismatch between digits, the pairing can be aborted, or it can be restarted with a new key agreement. After the user 400 has given positive confirmation on both the headset 300 and the handset 100, then the devices 100 and 300 are fully authenticated. In the next step 7, the devices 100 and 300 securely establish the link key. For example, the devices 100, 300 can both derive a symmetric encryption key based upon the elliptic curve Diffie-Hellman shared secret. A link key is created, and encrypted using the encryption key and send to the other device 300 which decrypts and stores it. The link key is then be used by the devices 100 and 300 for BLUETOOTH authentication and encryption. Alternately, a long PIN may be sent from one device 100 to the other encrypted with the encryption key. The other device 300 would then decrypt it and then the devices 100 and 300 would establish a link key based upon a shared PIN using the well-known BLUETOOTH procedure.

Figure 6:
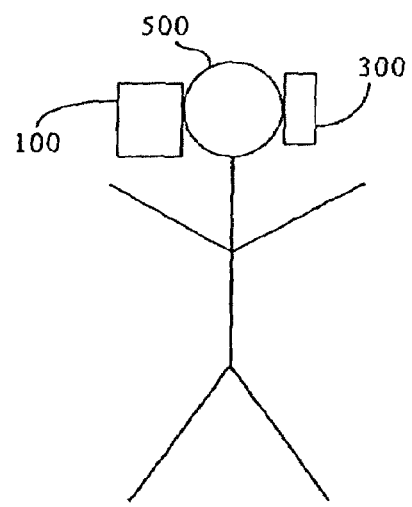
FIG. 6 is another example of a user performing a pairing procedure between a headset and a telephone.

In another embodiment, a user 500 using a method for pairing as described above in FIG. 5a pairs a BLUETOOTH headset 300 and the BLUETOOTH telephone 100, in FIG. 6. In this instance, the telephone 100 and the headset are unknown to each other and are being paired for the first time. The telephone 100 and headset 300 establish a BLUETOOTH wireless link 32 between each other. The handset 100 indicates to the user 500 that in order to complete the pairing procedure that the user 500 should verify that the digit string that is audibly played by the handset 100 via speaker 140 and the digit string that is audibly played by the headset 300 are identical. Typically, the user 500 has the speaker 310 of headset 300 on one ear and listens to the speaker 140 of telephone 100 with the other ear. When the user 500 responds that he is ready to begin, the two devices 100 and 300 perform a key agreement. Public keys are exchanged and a shared secret and an antispoof variable 36 are computed in each device, as described above.

The devices 100 and 300 begin the process of playing the digits of the antispoof variable 36 to the user 500, one after the other, in a time synchronized manner as described above. A determination is made as to which device 100 or 300 plays the first digit. This may be based upon the class of device. For example, a telephone 100 or PDA 200 might always initiate the pairing procedure before the headset 300. Alternately, it may be determined based upon some characteristic of each device that is known to both devices 100, 300 and is likely to be different. For example, a BLUETOOTH device address may be used such that a hash function of the two addresses is performed and the device 100 or 300 corresponding to the numerically greater outcome is chosen to be first. In this particular example, the headset 300 would be first. After both devices 100 and 300 have played the last digit, each device 100 and 300 prompts the user 500 to acknowledge whether the digits matched. If the digits match then the user 500 confirms this both on the headset 100 and the handset 300, then the devices 100 and 300 are fully authenticated. In the next step, the devices 100 and 300 securely establish the link key as described in the above method. However, if the user 500 indicates a mismatch between digits, the pairing is aborted, or it can be restarted with a new key agreement.

Figure 7:
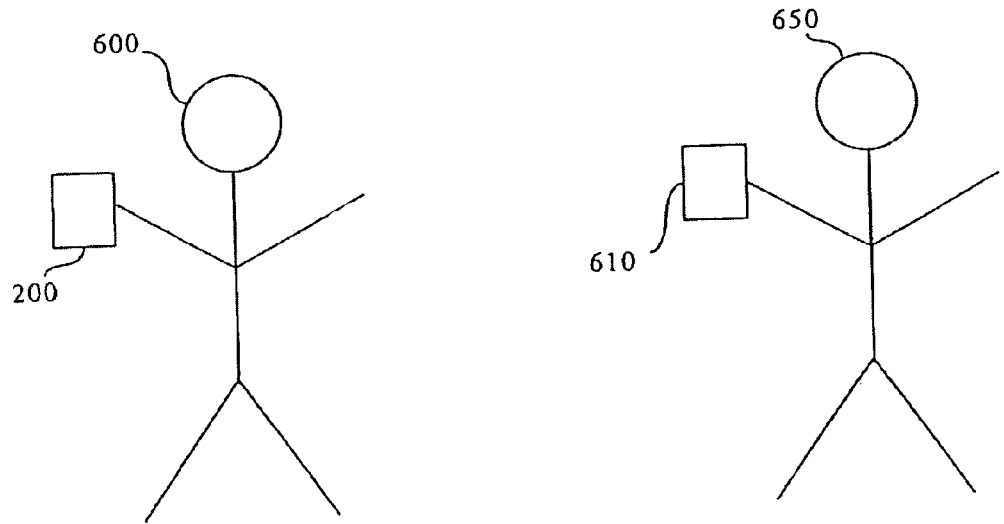
FIG. 7 is an example of pairing of two devices belonging to two users.

In another embodiment, two devices 200, 610 such as PDAs are paired with one another, as shown in FIG. 7. The devices 200 and 610 are similar to each other and belong to user 600 and user 650, respectively. The devices are paired using a method for pairing similar to the one described above in FIG. 5a. Generally, users 600 and 650 are separated by sufficient distance for both devices 200 and 610 to engage in unassisted, audio and visual communication with one another. In this instance, the two users 600, 650 approach each other and the two PDAs 200 and 610 establish a BLUETOOTH wireless connection in order to establish a link key. User 600 indicates via the user interface of PDA 200 that he desires to pair with PDA 610.

PDA 200 informs user 600 to verify that the first three digits displayed by PDA 200 are the same digits sent by the user 650 of PDA 610 at substantially the same time. Also, the user 610 is to inform the user 600 of PDA 200 the next three digits as they are displayed. Similarly, PDA 610 informs user 650 to verify that the first three digits displayed by PDA 610 are the same digits sent by the user 600 of PDA 200 at substantially the same time; and the user 600 then to tell the owner of PDA 200 the next three digits as they are displayed. Once the digits have been verified, the two devices 200 and 610 perform a key agreement. Public keys are exchanged and a shared secret and an antispoof variable 36 are computed in each device, as described above.

In the next step, both devices 200, 610 begin the process of displaying the digits of the antispoof variable 36 to their users one after the other in a time synchronized manner as described above. The devices 200, 610 display the digits at substantially the same time, and the digits are displayed a long enough time that they can be read by the users 600, 650. The displays are blanked for a predetermined time period between the display of digits.

After both devices 200 and 610 have played the last digit, each device 200 and 610 prompts the users 600 and 650 respectively to acknowledge whether the digits matched. If the digits are a match then the user 600 confirms this on the PDA 200 and the user 650 confirms the match on the PDA 610, then the devices 200 and 610 are fully authenticated. In the next step, the devices securely establish the link key as described in the above method. However, if the user 600 or 650 indicates a mismatch between digits, the pairing is aborted, or it can be restarted with a new key agreement. Because the procedure is performed with PDAs 200 and 610 in close proximity, the opportunity for a man-in-the-middle attack is reduced.

Figure 8:
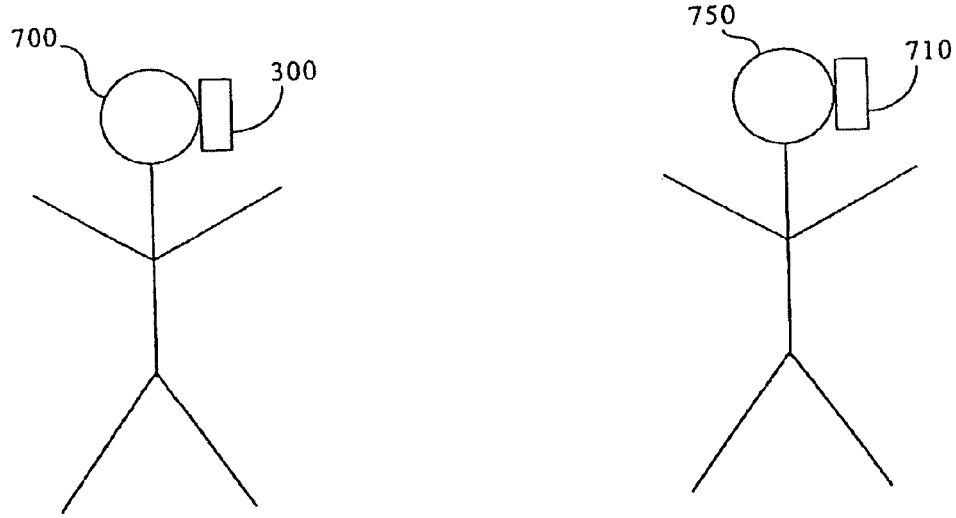
FIG. 8 is an example of two users pairing two headsets.

In another embodiment, two devices 300, 710 in FIG. 8, such as headsets, are paired with one another. The devices 300 and 710 are similar to each other and belong to users 700 and 750, respectively. The devices are paired using a method for pairing similar to the one described above in FIG. 5a. The users 700 and 750 are separated by a sufficient distance for both devices to engage in unassisted audio and visual communication with one another. In this instance the two users 700, 750 approach each other in order to establish a link key According to a variation of this embodiment, the two headsets 300 and 710 establish a BLUETOOTH wireless link 32 between each other. User 700 indicates via the user interface of headset 300 that he desires to pair with headset 710 and the headset 300 sends a message to headset 710 indicating that it desires to pair with headset 710. Once the users 700 and 750 accept the pairing, the procedure continues The headset 300 indicates to user 700 to inform the user 750 the first three digits as they are played and to then verify that the subsequent three digits sent by the user 750 correspond to the values heard from headset 300 at substantially the same time. Similarly, headset 710 indicates to user 750 to verify that the first three digits played by headset 710 are the same digits as told by the user 700 at substantially the same time and inform the user 700 the next three digits immediately after they are played. Once the digits have been verified, the two devices 300 and 710 perform a key agreement. Public keys are exchanged and a shared secret and an antispoof variable 36 are computed in each device, as described above.

In the next step, both headsets 300, 710 begin the process of playing the digits of the antispoof variable 36 to their users 700 and 750 one after the other, in a time synchronized manner as described above. The headsets 300, 710 play the digits, either audibly or through a visual signal, and the user 750 then verifies the digit as played on headset 710. After both devices 300 and 710 have played the last digit, each device 300 and 710 prompts the users 700 and 750 respectively to acknowledge whether the digits matched. If the digits are a match then the user 700 confirms this on the headset 300 and the user 750 confirms the match on the headset 710, then the devices 300 and 710 are fully authenticated. In the next step, the devices securely establish the link key as described in the above method of flowchart of FIG. 5a. However, if the user 700 or 750 indicates a mismatch between digits, the pairing is aborted, or it can be restarted with a new key agreement.

According to a second variation of the method of FIG. 8, headsets 300 and 710 both include voice recognition technology. The headset 300 indicates to user 760 to inform the user 750 of the first three digits, each immediately after it is played by headset 300; and that the user 700 is to then speak into the microphone of headset 300 the subsequent three digits told to user 700 by the user 750, each immediately after they are told. Similarly, headset 710 indicates to user 750 that the user 750 is to speak into the microphone of headset 710 the first three digits told to him by the user 700 of headset 300, each immediately after they are told and that the user 750 is to inform the user 700 of headset 300 the next three digits, each immediately after they are played by headset 710. Once the digits have been verified, the two devices 300 and 710 perform a key agreement. Public keys are exchanged and a shared secret and an antispoof variable 36 are computed in each device, as described above.

One headset 300 begins the process of playing the first three digits of the antispoof variable 36 to its user 700 while the other headset 710 begins the process of detecting via voice recognition technology the first three digits of the antispoof variable 36 as spoken by user 750. Time synchronization of this process between the two headsets 300, 710 is important. This can be achieved by basing the timing of this process on the time of the message with the last public key being exchanged. The headset 710 attempting to detect that its user 750 speaks the appropriate digit of the antispoof variable 36 will do this in a window of time shortly after the other headset 300 plays that digit of the antispoof variable 36 to its user 700. After each digit has been played, there is a pause of length long enough to allow the user 700 to indicate the digit just played to the other user 750 and for the other user 750 to speak the digit into the microphone of headset 710.

Timers can be used to regulate the times at which digits are played and the timing windows to be used for voice recognition of spoken digits in a similar manner, as described above with respect to FIG. 5. After both headsets 300, 710 have detected that the correct digits of the antispoof variable 36 were spoken into their microphones during the appropriate timing windows, then the headsets 300, 710 are fully authenticated. The devices 300, 710 can securely establish the link key as described above. If an incorrect digit is detected during a timing window or if the correct digit is not detected during a timing window, the pairing can be aborted, or it can be restarted with a new key agreement.

Figure 9:
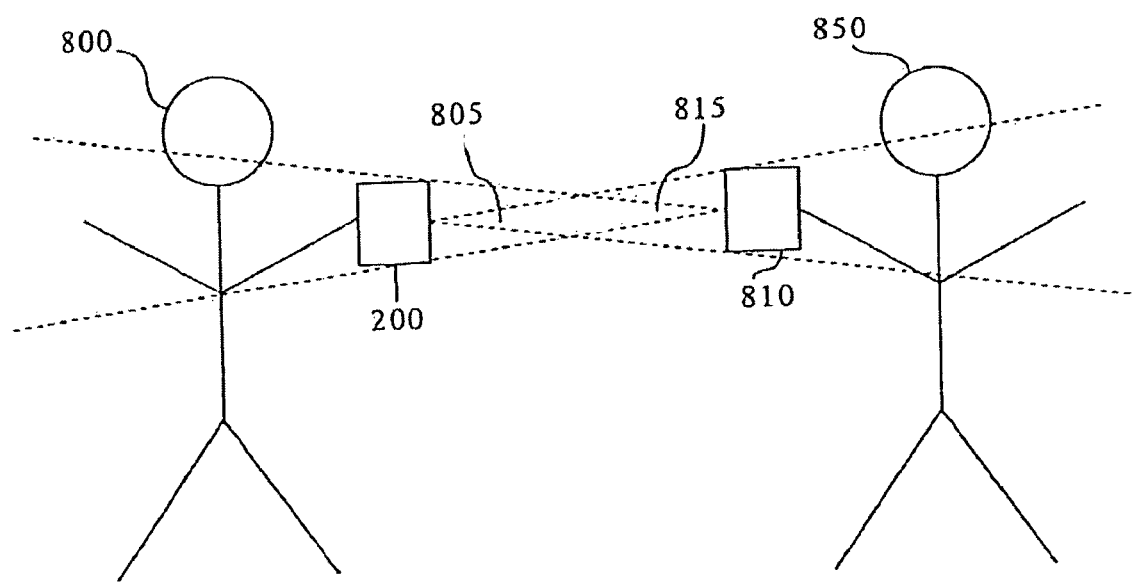
FIG. 9 is a user pairing two devices that support infra-red communication.

In another embodiment, a pairing procedure is performed between two devices 200, 810 that support infrared communication, in FIG. 9. The devices 200 and 810 are similar to each other and belong to users 800 and 850, respectively. Generally, the devices 200, 810 are paired using a method for pairing similar to the one described above in FIG. 5a. In FIG. 9, the users 800 and 850 are adjacent to one another and pointing their devices 200 and 810 at each other in such a way as to enable them to communicate with each other via infrared light. Cone 805 represents the coverage space or range of the infrared signal from device 200. Similarly, cone 815 represents coverage space or range of the infrared signal from device 810. The devices 200 and 810 are positionable such that device 810 is within cone 805, while device 200 is within cone 815. Although FIG. 9 uses a PDA as an example, the same procedure may be used to pair any two devices capable of infrared communication, such as two telephones.

Following the steps of the above mentioned, PDAs 200 and 810 establish a BLUETOOTH wireless link 32 between each other. PDA 200 indicates to user 800 to point PDA 200 at PDA 810 and similarly PDA 810 indicates to user 850 to point PDA 810 at PDA 200, so that the PDAs 200 and 810 are in the each other line of sight for IR communications. The PDAs 200, 810 then perform a key agreement via the wireless link 32. Public keys are then exchanged and the devices 200, 810 then compute a shared secret.

In the next step, each device 200, 810 compute two antispoof variables 36 based upon the shared secret, one for itself and one for the other device 200, 810. An antispoof variable 36 is computed based upon a piece of information known to both devices but different from each other, such as the BLUETOOTH device address. For example, PDA 200 computes its antispoof variable 36 by concatenating its BLUETOOTH device address with the shared secret and then inputting the result into the hash algorithm, such as SHA-1. Thus the output of hash algorithm is PDA 200's antispoof variable 36. Similarly, PDA 200 could compute PDA 810's antispoof variable 36 by concatenating PDA 810's BLUETOOTH device address with the shared secret and then inputting the result into the SHA-1 hash algorithm. The output of SHA-1 is the PDA 810's antispoof variable 36. Alternately, PDA 810 performs similar calculations to compute PDA 200's anti-spoof variable 36. Unlike the antispoof variable 36 of the prior examples, the antispoof variable 36 used in this application need not be made small for the sake of verification by a human since it is transmitted via infrared; therefore, the antispoof variable 36 is made longer.

PDA 200 transmits its own antispoof variable 36 to PDA 810 over the infrared link 32, and similarly, PDA 810 transmits its own antispoof variable 36 to PDA 200 over the infrared link. 32. PDA 810 receives PDA 200's antispoof variable 36 over the infrared link 32 and compares the received value to its internally computed value; if the two match, the other device has been authenticated, and vice versa. After PDAs 200, 810 verify the antispoof variable 36 from the other PDA, 200, 810 are fully authenticated, then a link key is securely established as described with respect to FIG. 5. If one of the antispoof variables 36 does not match the expected value, the pairing can be aborted, or it can be restarted with a new key agreement.

It should be noted that the limited range of the infrared light provides substantial protection against a man-in-the-middle attacker, as the attacker would have to be able to receive the infrared light within cones 805 and 815 to perpetrate an attack. The attacker would also have to be able to transmit infrared light to both devices 200 and 810. It should be noted that a very similar procedure might be used by a single user to pair two devices.

Figure 10:
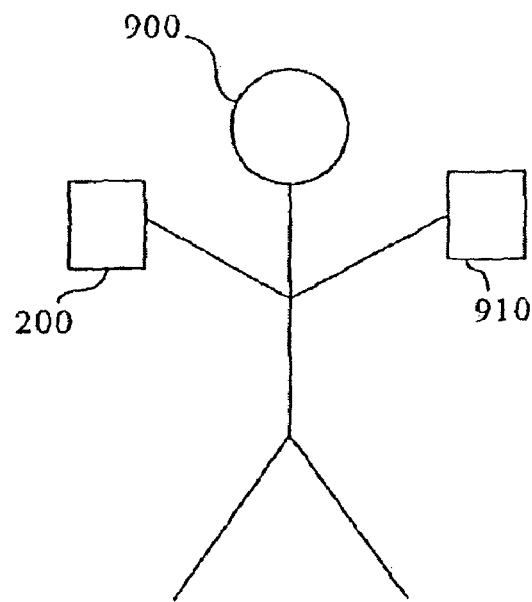
FIG. 10 is a user pairing two devices that support audio communication.

In yet another embodiment, in FIG. 10 two devices 200, 910 that support audio communication, are paired together using a method as described above in FIG. 5a. However, in the method does not require a user 900 to manually check an antispoof variable 36. PDA 910 is similar to PDA 200 and both have a microphone and a speaker. User 900 is holding the PDAs close together in such a way that sound from the speaker of PDA 200 readily detectable by the microphone of PDA 910 and vice versa. PDAs 200 and 910 establish a BLUETOOTH wireless link 32 between each other. User 900 indicates via the user interfaces of PDA 200 and PDA 910 that he desires to pair the devices with each other.

The PDAs 200, 910 perform a key agreement, during which public keys are exchanged and a shared secret is computed. In the following step, each device 200, 910 compute two antispoof variables 36 based upon the shared secret, one for itself and one for the other device. An antispoof variable 36 is computed based upon a piece of information known to both devices 200, 910, as described above.

PDA 200 transmits its own antispoof variable 36 to PDA 910 using its speaker and a suitable audio modulation scheme such as audio frequency shift keying (AFSK). Similarly, PDA 910 transmits its own antispoof variable 36 to PDA 200 using its speaker and a suitable audio modulation scheme such as AFSK. PDA 910 receives PDA 200's antispoof variable 36 by demodulating the audio received from its microphone and compare the received value to its internally computed value, if the two match, the other device has been authenticated. Similarly, PDA 200 receives PDA 910's antispoof variable 36 by demodulating the audio received from its microphone and compare the received value to its internally computed value, if the two match, the other device 200 is then authenticated. If one of the antispoof variables 36 does not match the expected value, the pairing is aborted, or it can be restarted with a new key agreement. After PDAs 200, 910 verify the antispoof variable 36 from one another, they are then fully authenticated. The PDAs 200, 910 then securely establish the link key as described with respect to FIG. 5. Thus, this method provides substantial protection against the possibility of a man-in-the-middle attack, although a man-in-the-middle attacker may be able to perpetrate an attack if the attacker had equipment capable of receiving the audio from devices 200 and 910 and capable of transmitting audio to devices 200 and 910.

Figure 11:
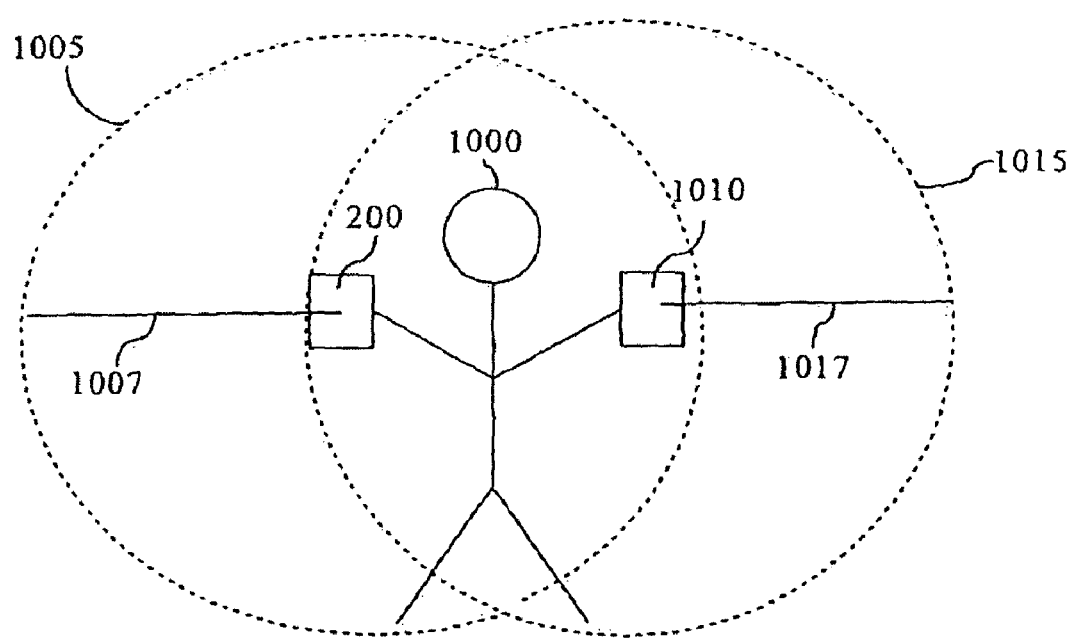
FIG. 11 is a user pairing two devices.

In yet another embodiment, a link key is established between two devices 200, 1010, as shown in FIG. 11. This method does not require a user 1000 to manually verify an antispoof variable 36 to on both devices 200, 1010. Furthermore, the method provides substantial more protection against the possibility of a man-in-the-middle attack than the previous embodiment. PDA 1010 is similar to PDA 200, which includes a microphone and a speaker. In order to initiate the pairing procedure, the user 1000 positions the PDAs 200, 1010 adjacent to each other in such a way that sound from the speaker of PDA 200 readily detectable by the microphone of PDA 1010 and vice versa. Typically, PDA 200 is within one foot of PDA 1010. Although in this embodiment PDAs 200, 1010 are used, the same procedure-may be used to pair other devices with the similar attributes. FIG. 1 shows a space of coverage represented by sphere 1005 which is centered on PDA 200, with a radius 1007. Also, a space of coverage represented by sphere 1015 has a radius comparable to radius 1017 and which is centered on PDA 1010. Therefore, PDA 200 is within sphere 1015 and PDA 1010 is within sphere 1005.

The method of this embodiment minimizes a man-in-the-middle attack from being perpetrated based upon the distance between the devices 200, 1010 being paired. The user 1000 of the devices 200, 1010 brings the devices 200, 1010 within a predetermined distance of one another. As long as the devices 200, 1010 are within this predetermined distance, they can be paired. If the distance between the devices 200, 1010 exceeds this predetermined distance, pairing is not allowed. The effect of this is that an attacker would also be required to be within the predetermined distance of both devices being paired in order to perpetrate a man-in-the-middle attack. Since the user 1000 of the two devices 200, 1010 can be confident of the physical security of the immediate area surrounding the devices 200, 1010, the man-in-the-middle attack can substantially diminished. For example, this predetermined distance may be equal to the dimensions of radius 1007 or 1017, which is one foot. The user 1000 of FIG. 11 may be in a crowded room fill of people with BLUETOOTH devices within radio range of PDA 200 and PDA 1010. The BLUETOOTH devices of the other people may all be potential man-in-the-middle attackers, but since the user 1000 can be confident that they are all further than one foot or some other predetermined distance from his BLUETOOTH devices 200, 1010. Thus, the user 1000 is substantially safe from a man-in-the-middle attack while pairing PDAs 200, 1010.

Returning to FIG. 11, in order to overcome the man-in-the-middle attack, both devices 200, 1010 perform a key agreement, and then each device 200, 1010 computes two separate antispoof variables 36 based on the shared secret (one for itself and one for the other device). The devices 200, 1010 then authenticate each other based upon distance from one another. A secure method to determine the distance from one device 200 to the other device 1010 follows and is used for the authentication based upon distance. A device 200 securely determines the distance to the other device 1010 using a challenge. In FIG. 11, the challenge is a random number with the same number of bits as the antispoof variable 36; the random number acts as a challenge of the authenticated device 1010. The authenticating device 200 transmits the challenge to the authenticated device 1010 in multiple portions. As an example, the random number is transmitted one bit at a time, starting with the most significant bit and continuing with successively less significant bits. The authenticated device 1010 transmits a response to each portion of the challenge after receipt of the portion of the challenge. The authenticated device 1010 generates the response by inputting the received portion of the challenge and a particular piece of information into a function whose output is the response.

It is important that the function generates a response that varies both depending upon the received portion of the challenge and also depending upon the particular piece of information. The response is preferably short and equal in length to the received portion of the challenge. The particular piece of information may be an antispoof variable 36 or, if public key cryptography is used, the authenticated device 1010's private key. If public key cryptography is used, it is substantially difficult for an attacker to determine the private key based on the output of the function. In FIG. 11, the response is a single bit and is the output of an exclusive or (XOR) function whose inputs are the just received bit of the random number and a bit of the device's antispoof variable 36 (which may be one based upon its own address). For example, the first response bit is formed by taking the XOR of the received most significant bit of the random number and the most significant bit of the antispoof variable 36; subsequent response bits are formed by taking the XOR of the received bit of the random number and subsequently less significant bits.

Generally, the time between the reception of the portion of the challenge by the authenticated device 1010 and the transmission of the response is related to the amount of time it takes for the transmitted signal to travel a distance twice the tolerable error in measurement. For example, suppose that the authenticating device 200 wishes that the authenticated device 1010 to be no more than one foot away then the authenticating device 200 permits one half foot of error for processing time, however. In a case where RF is used to transmit the portion of the challenge and the response, one nanosecond of processing time is allowed for a half of a foot of error because the speed of light is about one foot per nanosecond. In a case where audio is used to transmit the random bit and the response, one millisecond of processing time is allowed for a half of a foot of error because the speed of sound is about one foot per millisecond. The authenticated device 1010 is configured to return a response within this amount of processing time, since longer processing times would give an attacker an opportunity to appear to be closer. Accordingly, in FIG. 11, the shared secret and antispoof variable 36 are precomputed and the only computation required by the authenticated device 1010 is an XOR of a single bit which, according to current technology, can easily be performed within an amount of time that would correspond to an acceptably short error distance devoted to processing time for either RF or audio signal transmission.

Correspondingly, the amount of time required to transmit the portion of the challenge by the authenticating device is related to the amount of time it takes for the transmitted signal to travel a distance twice the tolerable error in measurement. The reason is that many modulation schemes provide redundant information that may be used by an attacker to determine a transmitted bit's value before the entire transmission time allocated to the bit. For example, suppose that a CDMA modulation scheme is used for an RF transmission of a single random bit and that the time required for a single modulation symbol were one microsecond and that the spreading of the random bit with the spreading code resulted in ten modulation symbols (10 microseconds) required to transmit the random bit. The authenticated device 1010 is then allowed the full ten microseconds to despread and recover the bit. If there were no interference, however, an attacker could potentially recover the value of the random bit after a single modulation symbol (one microsecond); the attacker could then immediately transmit a response and appear to be about 4500 feet closer than he actually is (9 microseconds*1 foot/nanosecond*1000 nanoseconds/microseconds/2=4500 feet).

As another example suppose that an AFSK modulation scheme is used for an audio transmission of the random bit and that the time required for a single bit were 50 milliseconds and that the frequency used for a logic one were 1.200 Hz and that the frequency used for a logic zero were 1800 Hz. The authenticated device 1010 is then allowed the fall, 50 milliseconds to recover the bit. An attacker can recover the value of the random bit after a single cycle at 1200 Hz. The attacker can then immediately transmit a response and appear to be about 49 feet closer than he actually is (50 milliseconds −1/1.2 kHz)*1 foot/millisecond/2=49.17 feet). For example suppose that the authenticating device 200 wishes that the authenticated device 1016 to be no more than one foot away, the authenticating device 200 permits one half foot of error, however. In the case where RF is used to transmit the random bit and the response, one nanosecond transmission time for the, bit is allowed for a half of a foot of error because the speed of light is about one foot per nanosecond. In the case audio is used to transmit the random bit and the response, one millisecond of transmission time for the bit is allowed for a half of a foot of error because the speed of sound is about one foot per millisecond.

Figure 11A:
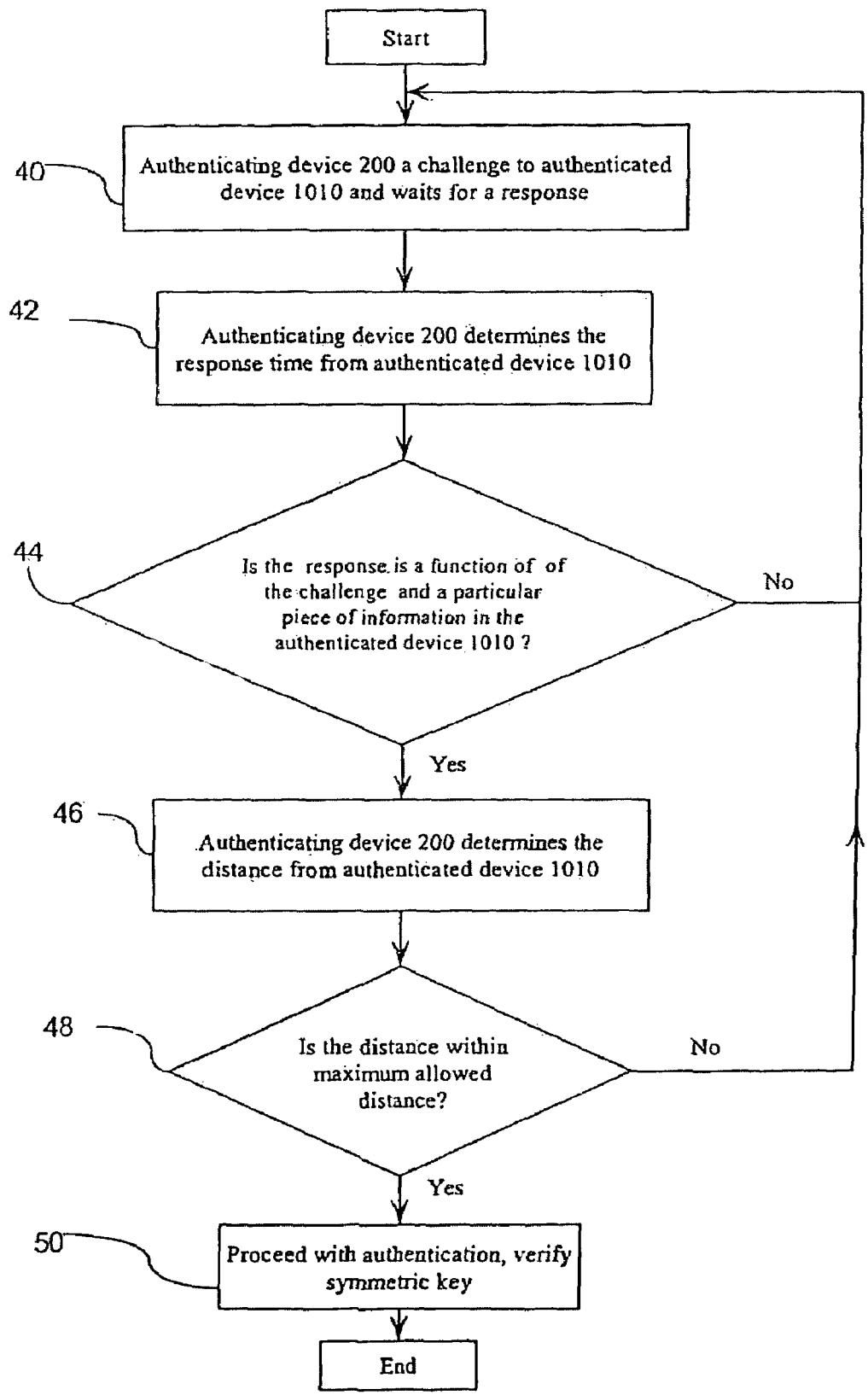
FIG. 11A is a flowchart outlining verification steps for pairing devices.

Now referring to the flowchart of FIG. 11a, generally one challenge bit is transmitted by authenticating device 200 to the authenticated device 1010 during a single transmission time period, in step 40. However, it is possible to transmit more than one challenge bit during a single transmission time period as long as the transmission time period is still short enough that it is less than the amount of time it takes for the transmitted signal to travel a distance twice the tolerable error in measurement. In step 42, the authenticating device 200 measures the time of the response from authenticated device 1010. In the following step 44, the authenticating device 200 determines whether the response is a function of the portion of the challenge that was transmitted and the particular piece of information in the authenticated device 1010. If the response meets these two requirements, the process proceeds to the next step 46, else authentication fails and can be restarted. This verification function may be performed with an antispoof variable 36 or, if public key cryptography is used, the authenticated device 1010's public key. It should be noted that the verification function does not necessarily need to operate on one response at a time; it could potentially operate on a number of responses combined. In FIG. 11, the authenticating device 200 measures the time of the response bit and also take the XOR of the response bit with the random bit to which the response bit is a response and verifies that it is the same as the appropriate bit of the antispoof variable 36.

Upon reception of the response, the authenticating device 200 determines the round trip time from the time the transmittal of the challenge and the time of the response. In step 46, the authenticating device 200 then multiplies this time by the speed of the signal used and divides it by two to determine the distance of device 1010 from device 200. A determination is made by device 200 as to whether the other device 1010 is within the maximum allowed distance, in step 48. If the other device 1010 is not within the maximum allowed distance then the authentication process is aborted and can be restarted. However, if the other device 1010 is determined to be within the maximum allowed distance, then the authenticating device 200 proceeds with the authentication process, in step 50. In order to pass the authentication, a number of response bits must be checked since an attacker could guess correctly half of the time. A number of bit errors may be allowed to allow for transmission errors, but the number of correct bits must be substantially close to 100% of the bits. Furthermore, in FIG. 11 this entire process may be repeated with additional antispoof variables 36 generated with different inputs to the hash function. The number of correct bits could then be measured over a number of attempts. However, preferably the same antispoof variable 36 is not verified more than twice because an attacker could determine the antispoof variable 36 after the first verification.

Figure 12:
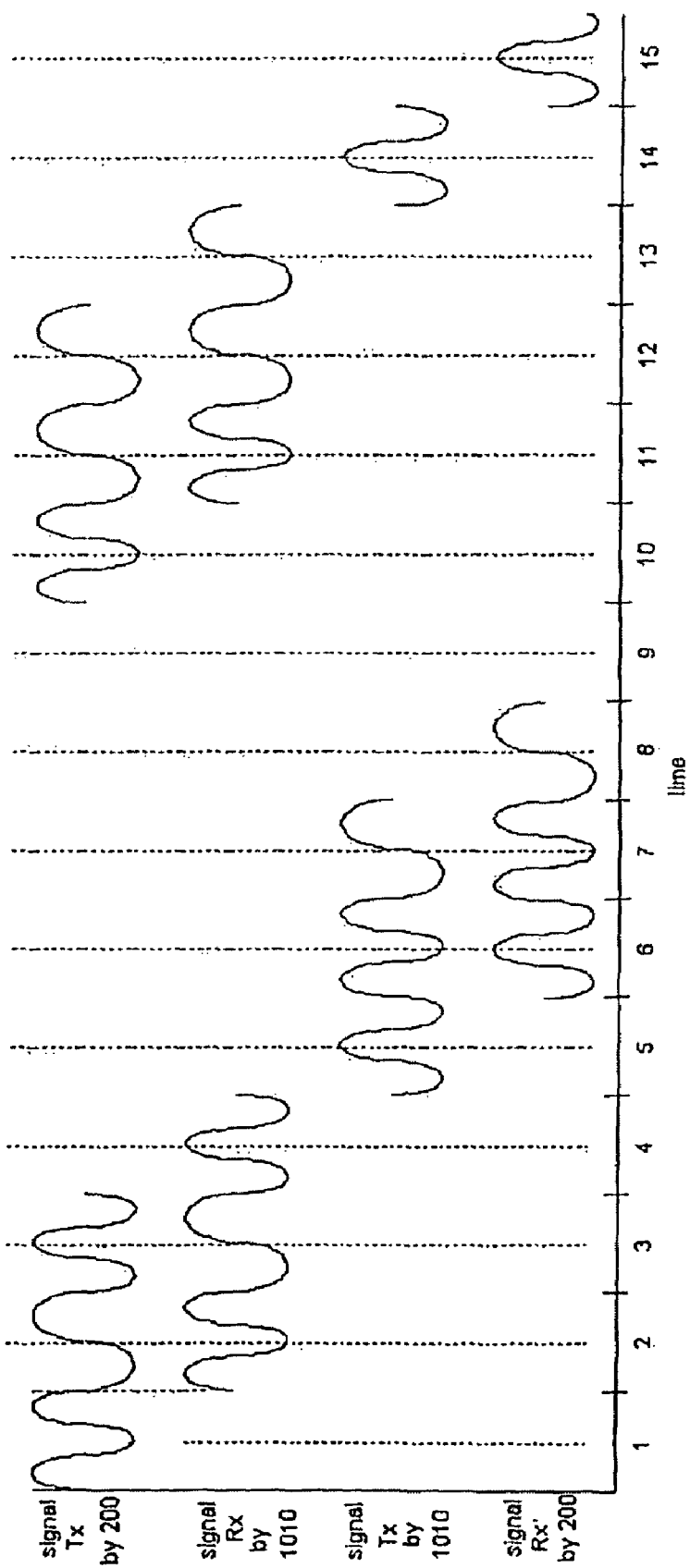
FIG. 12 shows the signals transmitted and received by two devices of FIG. 11, where one device authenticates the proximity of another device.

Referring to FIG. 12, there is shown in detail some of the signals transmitted and received by devices 200 and 1010 when device 200 authenticates the proximity of device 1010. Before the period shown by FIG. 12, the devices have already performed a key agreement and have computed device 1010's antispoof variable 36. FIG. 12 shows the transmission of two random bits by device 200, the reception of the random bits by device 1010, the transmission of two response bits by device 1010, and the reception of two response bits by device 200. The first (most significant) random bit is zero; the second random bit is one. The most significant bit of device 1010's antispoof variable 36 is zero; the next most significant bit is one. The predetermined distance allowed 1007 is assumed to be one foot. The actual distance between device 200 and device 1010 is assumed to be 10 inches. Furthermore one half foot of error is tolerated for processing time and due to the modulation of the random bits. From the previous discussion, one can see that authenticating using RF signals may be difficult depending upon the RF technology used.

BLUETOOTH wireless technology operates in the 2400 to 2483.5 MHz band and uses Gaussian Frequency Shift Keying modulation and a symbol rate of 1 million symbols per second. Furthermore, the BLUETOOTH physical layer is not designed in such a way as to facilitate quickly changing between transmit and receive modes. The processing and response times to authenticate using BLUETOOTH RF signals would have to be much smaller (about one nanosecond) than they actually are. Authenticating with audio is reasonable for a BLUETOOTH device including audio components. However, it is assumed that the atmospheric conditions are such that the speed of sound is exactly one foot per second. For one half foot of error, one millisecond is allocated for processing time and for transmission of the random bit.

Using the processor 240 of a conventional BLUETOOTH device 200 or 1010, the processing time required is measured in microseconds and is negligible compared to one millisecond. Using conventional audio modulation techniques, it is reasonable to send a single random bit within one millisecond with time to spare. Assuming that AFSK modulation is used at 1200 bits per second (one bit requires 0.833 milliseconds), then one cycle of 1200 Hz is used to represent a logic one, while one and a half cycles of 1800 Hz is used to represent a logic zero. The device 200 transmits (Tx) random bits using its speaker and device 1010 receives (Rx) the random bits using its microphone. Device 1010 transmits (Tx) response bits using its speaker, device 200 receives (Rx) the bits using its microphone. The intervals in FIG. 12 correspond to times $\frac{1}{1200}$ second in length and are the times required to transmit a single bit. Since the distance between the devices 200 1010 is 10 inches, this $\frac{1}{1200}$ second bit time also corresponds exactly to the amount of time it takes for sound to travel from one device to the other. At time 1 device 200 transmits a zero; at time 2 device 200 transmits a one. These first two bits are a predetermined and are used by device 1010 to synchronize with the signal transmitted by device 200. Generally other synchronization techniques may be used, for example, a long synchronization word may be sent by device 200 followed by random bits one at a time at predetermined intervals after the synchronization word.

At time 3 device 200 transmits the first random bit, zero. At times 2, 3, and 4, device 1010 receives these three bits. Device 1010 determines that the value of the bit received at time 4 is zero and then XORs that with the most significant bit of its antispoof variable 36 (zero) to arrive at the result of zero. The result of zero is then transmitted by device 1010 at time 5 and device 1010 then transmits zero and one at times 6 and 7, respectively. These two bits transmitted at times 6 and 7 can be used by device 200 for synchronization. In another example, device 1010 could alternatively transmit a long synchronization word in response to a synchronization word from device 200; then it could transmit response bits one after the other in response to the received random bits. Device 200 receives the three bits from device 1010 at times 6, 7, and 8, and recovers the bit zero at time 6. Device 200 could take advantage of the synchronization bits at times 7 and 8 by sampling for three bit periods and working backwards to time 6 after recognizing the synchronization bits.

Next, the device 200 makes a distance calculation as follows based upon the time difference between the beginning of time period 6 and the end of time period 3 (2*0.833 milliseconds): distance=2*0.833 milliseconds*one foot/millisecond/2=0.833 feet. Since the calculated distance is less than one foot, the distance is authenticated. Device 200 then XORs the received response bit zero with the random bit zero to arrive at zero. Device 200 then compares zero to the most significant bit of device 1010's antispoof variable 36 (zero), and since they are the same, the first bit is effectively verified. At time 10 device 200 transmits a zero and at time 11 device 200 transmits a one. These first two bits are synchronization bits as were the bits transmitted at times 1 and 2. At time 12 device 200 transmits the second random bit, one and at times 11, 12, and 13, device 1010 receives these three bits. Device 1010 determines that the value of the bit received at time 13 is one and then XORs that with the second most significant bit of its antispoof variable 36 (one) to arrive at the result of zero. The result of zero is then transmitted by device 1010 at time 14 transmits synchronization bits (not shown). Device 200 receives the response bit from device 1010 at time 15 and device 200 recovers the bit zero at time 15 and makes a distance calculation as previously described. Since the calculated distance is less than one foot, the distance is authenticated. Device 200 then XORs the received response bit zero with the random bit one to arrive at one. Device 200 then compares one to the most significant bit of device 1010's antispoof variable 36 (one). Since they are the same, the second bit is effectively verified. The same procedure is continued for the remainder of the random bits and the bits of device 1010s antispoof variable 36. Device 1010 is considered authenticated when a sufficient percentage of the bits are verified. Similarly, device 1010 would then authenticate device 200.

Thereafter, the key agreement protocol proceeds as described above. Although BLUETOOTH RF signals are not suitable for the distance authentication, it should be noted that radios using certain other RF technologies would be suitable for implementing distance authentication using RF signals. In fact, for a pair of radios including such, a suitable technology, distance authentication using RF signals is preferable to distance authentication using audio signals. According to Ultra-Wideband technology, very low-power radio pulses are transmitted that cover a large range of frequency spectrum of 1 GHz to 4 GHz, for example. The pulses can be so short as to be measured in the hundreds of picoseconds. A data bit may be modulated by time shifting the transmitted pulse; for example, a pulse advanced in time by a few picoseconds could represent a logic zero while a pulse delayed by a few picoseconds could represent logic one. With this sort of modulation scheme, an ultra-wideband radio performing a distance authentication can transmit a random challenge bit in a short enough time as to preclude an attacker from demodulating the bit substantially sooner than the authenticated device 1010. As long as the authenticated device 1010 can demodulate the random bit and transmit the response using a small amount of processing time (1 ns for ½ foot of error) and as long as the authenticating device 200 can demodulate and measure the time of the response, ultra-wideband radio technology can be used to provide location based authentication while preventing a man-in-the-middle attack.

Although FIG. 12 shows gaps with no audio transmitted by the authenticating device 200 when it is waiting for a response and with no audio transmitted by the authenticated device 1010 when it is waiting for the next random bit, it is possible to eliminate these gaps. If the authenticating device 200 and the authenticated device 1010 both have audio cancellation capability as is well known, they can cancel the known signal they transmit from their speaker from the received signal received by their microphones. This would enable both to transmit at the same time without impairing their ability to receive the other's signal. The authenticating device 200 could transmit the random bits one after the other without any synchronization bits between them; similarly, the authenticated device 1010 could transmit the response bits one after the other without any synchronization bits between them. In this case, the synchronization could occur via a synchronization word and response transmitted before the first random bit is transmitted.

Various modifications of the above-described methods are possible. For example, it may be possible to securely determine the distance between two devices by sending the challenge using an audio signal and receiving the response via an RF signal, or by sending the challenge using an RF signal and receiving the response using an audio signal.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method of establishing a link key between a first device operable to authenticate a second device, the method comprising:
   the first device permitting non-sensitive communications with the second device when the first and second devices are spaced from each other within a first operating range;
   the first device permitting sensitive communications with the second device only when the first and second devices are spaced from each other within a second operating range, the second operating range being less than the first operating range;
   upon detecting initiation of a pairing process for establishing the link key, the first device sending a challenge to the second device to both verify the identity of the second device and determine a distance between the first and second devices;
   the first device receiving, from the second device, a response to the challenge;
   the first device determining whether the response is a function of at least a portion of the challenge and information in the second device;
   the first device using the response to also determine a response time associated with receipt of the response to the challenge;
   the first device using the response time to determine the distance between the first and second devices; and
   if the distance between the first and second devices is within the second operating range, and the response is a function of both at least a portion of the challenge and information in the second device, initiating an authentication process to establish the link key in the first device to permit the link key to be used in subsequent communications.

2. The method according to claim 1, wherein if the response is not a function of at least a portion of the challenge and information in the second device, the method is aborted prior to determining the distance between the first and second devices.

3. The method according to claim 1, wherein sending the challenge and receiving the response comprises sending the challenge in multiple portions and receiving multiple responses.

4. The method according to claim 3, wherein the challenge comprises a random number having a plurality of bits, and wherein said sending the challenge in multiple portions comprises sending a most significant bit and continuing successively with less significant bits.

5. The method according to claim 1, wherein the response time is related to an amount of time it takes for a transmitted signal to travel a distance twice a tolerable error in measurement.

6. The method according to claim 1, wherein multiplying the response time by a speed associated with a signal type used and dividing this by two computes the distance.

7. The method according to claim 1, wherein the challenge and response are exchanged using any one of the following signals: a radio frequency (RF) signal, an ultra-wideband signal, a sound signal, a Bluetooth signal, and an infrared (IR) signal.

8. A communication device operable to communicate over a communication link, the communication device comprising:
a processor and a memory, the memory comprising computer executable instructions that, when executed, cause the processor to be operable to:
permit non-sensitive communications with another device when it and the other device are spaced from each other within a first operating range;
permit sensitive communications with the other device only when the communication device and the other device are spaced from each other within a second operating range, the second operating range being less than the first operating range;
upon detecting initiation of a pairing process for establishing the link key, send a challenge to the other device to both verify the identity of the other device and determine a distance between the communication device and the other device;
receive, from the other device, a response to the challenge;
determine whether the response is a function of at least a portion of the challenge and information in the other device;
use the response to also determine a response time associated with receipt of the response to the challenge;
use the response time to determine the distance between it and the other device; and
if the distance between it and the other device is within the second operating range, and the response is a function of both at least a portion of the challenge and information in the other device, initiate an authentication process to establish the link key in the communication device to permit the link key to be used in subsequent communications.

9. The device according to claim 8, wherein if the response is not a function of at least a portion of the challenge and information in the other device, the authentication process is aborted prior to determining the distance between the communication device and the other device.

10. The device according to claim 8, wherein the challenge and the response are sent and received by sending the challenge in multiple portions and receiving multiple responses.

11. The device according to claim 10, wherein the challenge comprises a random number having a plurality of bits, and wherein said sending the challenge in multiple portions comprises sending a most significant bit and continuing successively with less significant bits.

12. The device according to claim 8, wherein the response time is related to an amount of time it takes for a transmitted signal to travel a distance twice a tolerable error in measurement.

13. The device according to claim 8, wherein multiplying the response time by a speed associated with a signal type used and dividing this by two computes the distance.

14. The device according to claim 8, wherein the communication link is operable to exchange the challenge and response using any one of the following signals: a radio frequency (RF) signal, an ultra-wideband signal, a sound signal, a Bluetooth signal, and an infrared (IR) signal.

15. A non-transitory computer readable medium comprising computer executable instructions for having a communication device communicate over a communication link, the computer executable instructions comprising instructions for:
permitting non-sensitive communications with another device when it and the other device are spaced from each other within a first operating range;
permitting sensitive communications with the other device only when it and the other device are spaced from each other within a second operating range, the second operating range being less than the first operating range;
upon detecting initiation of a pairing process for establishing the link key, sending a challenge to the other device to both verify the identity of the other device and determine a distance between it and the other;
receiving, from the other device, a response to the challenge;
determining whether the response is a function of at least a portion of the challenge and information in the other device;
using the response to also determine a response time associated with receipt of the response to the challenge;
using the response time to determine the distance between it and the other device; and
if the distance between it and the other device is within the second operating range, and the response is a function of both at least a portion of the challenge and information in the other device, initiating an authentication process to establish the link key in the communication device to permit the link key to be used in subsequent communications prior to determining the distance between the communication device and the other device.

16. The medium according to claim 15, wherein if the response is not a function of at least a portion of the challenge and information in the other device, the authentication process is aborted.

17. The medium according to claim 15, wherein the challenge and the response are sent and received by sending the challenge in multiple portions and receiving multiple responses.

18. The medium according to claim 17, wherein the challenge comprises a random number having a plurality of bits, and wherein said sending the challenge in multiple portions comprises sending a most significant bit and continuing successively with less significant bits.

19. The medium according to claim 15, wherein the response time is related to an amount of time it takes for a transmitted signal to travel a distance twice a tolerable error in measurement.

20. The medium according to claim 15, wherein multiplying the response time by a speed associated with a signal type used and dividing this by two computes the distance.

21. The medium according to claim 15, wherein the communication link is operable to exchange the challenge and response using any one of the following signals: a radio frequency (RF) signal, an ultra-wideband signal, a sound signal, a Bluetooth signal, and an infrared (IR) signal.

* * * * *